July 22, 1930. J. C. GROBLE Re. 17,738

FLUID PRESSURE REGULATOR

Original Filed Feb. 15, 1926

INVENTOR.
JACOB C. GROBLE.

BY

ATTORNEYS.

Reissued July 22, 1930

Re. 17,738

UNITED STATES PATENT OFFICE

JACOB C. GROBLE, OF ANDERSON, INDIANA

FLUID-PRESSURE REGULATOR

Original No. 1,588,411, dated June 15, 1926, Serial No. 88,359, filed February 15, 1926. Application for reissue filed January 13, 1930. Serial No. 420,616.

This invention pertains to a gas pressure regulator, particularly of the automatic type and is an improvement over Letters Patent No. 1,283,502, patented November 5, 1918.

The object of this improvement is to so construct the valve and attachment therefor as to render it more accessible, and easier to remove, whereby the valve may be cleaned or replaced quickly and without difficulty after the regulator has been installed and in use.

One feature of this invention resides in the construction of the valve-retaining head and supporting member therefor, whereby the valve will be prevented from having rotary movement with respect to the lever so as to avoid variation in its seating position, while at the same time permitting it to slip in and out of its connection with the lever without necessity of manipulation, the valve being releasably held in position by an arrangement in the nature of a spring snap fastener as will be hereinafter more fully set forth and described.

The full nature of this invention will be understood from the accompanying drawings and from the following description and claims.

Figure 1:
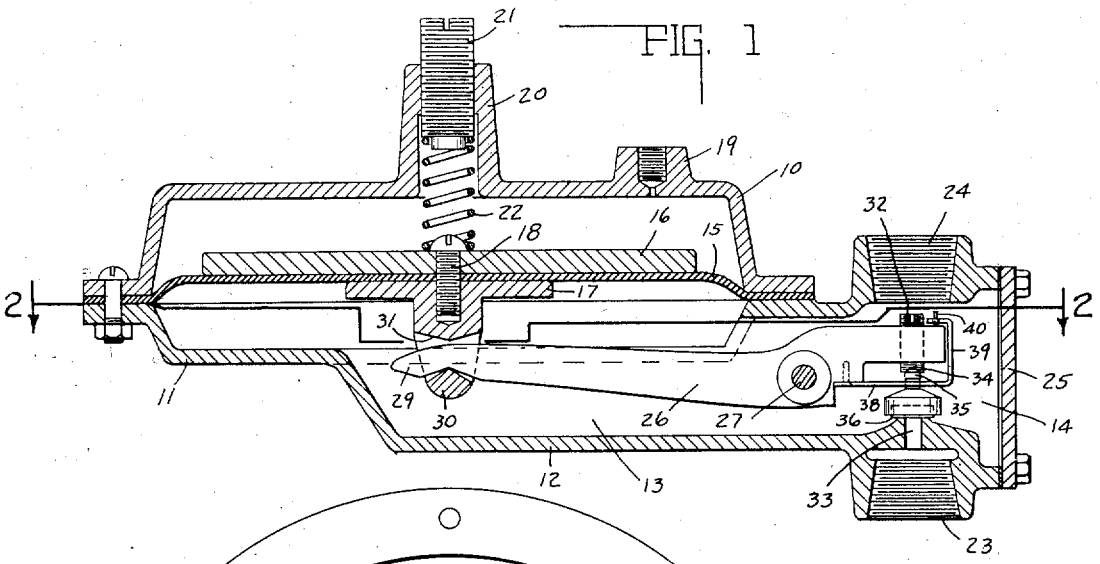
Figure 2:
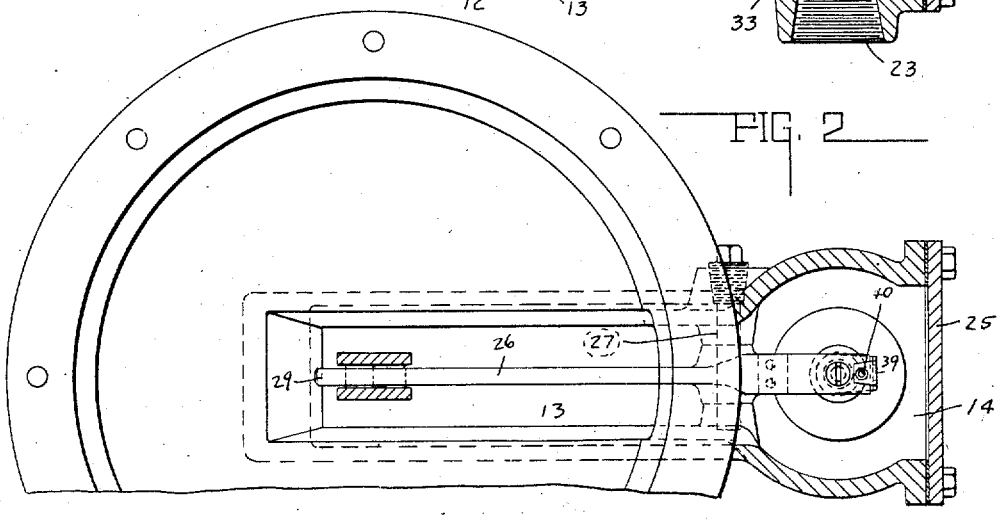
Figure 3:
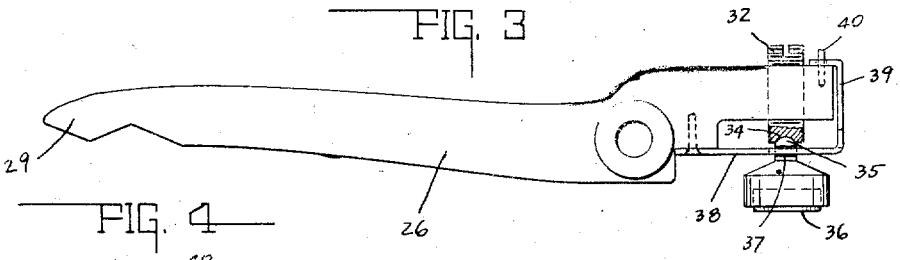
Figure 4:
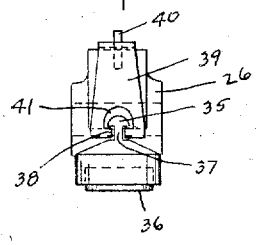

In the drawings, Figure 1 is a central vertical section taken through the gas regulator. Figure 2 is a section taken on the line 2—2 of Figure 1. Figure 3 is an enlarged side elevation of the valve attachment. Figure 4 is a front elevation thereof.

In the drawings there is shown a gas pressure regulator of the usual form having a trap frame in two sections, the upper section 10 and the lower section 11. Said lower section is provided with a depression 12 forming a laterally extending channel 13, which terminates in a valve housing 14. Said sections are provided with abutting flanges which may be secured together by the usual bolts so as to completely encase the operating mechanism.

Secured between the flanges there is provided a leather diaphragm 15 having an upper metallic plate 16 covering the greater portion of the area thereof, said plate 16 being rigidly secured to the lower plate 17 by a screw 18, whereby the leather diaphragm will be clamped and securely held therebetween. The upper section of the casing is provided with a ventilator 19 and a centrally positioned and upwardly positioned thimble 20 having an adjusting screw 21 adapted to screw downwardly therefrom and engage a pressure spring 22 which is mounted between the lower end of the screw 21 and the upper end of the screw 18.

The valve housing 14 is provided with a gas intake passage 23 and a gas fluid outlet passage 24, whereby the fluid, the pressure of which is to be regulated, will pass into the valve housing and exert an upward pressure against the diaphragm 15. The end of the valve housing is closed by a removable plate 25 which may be readily removed for permitting access to be had to the interior of the valve housing.

Mounted in the lower casing, there is a valve actuating lever 26 which is fulcrumed on a pin 27 extending laterally through the valve housing and detachably secured therein by a screw threaded nut 28 so as to be removable therefrom. The rear end of the lever is formed with a downwardly turned head 29 which is so designed as to extend through an opening provided between the knife edge bearing members 30 and 31 of the downwardly extending projection formed on the plate 17. The opening between the knife edges is of such size and width as to permit the end of the lever bearing the head 29 to be readily inserted therethrough and hooked over the lower knife edge 30 so as to normally bear thereupon. The opposite end of the lever extends into the valve housing and is provided with an adjustable valve stem screw 32, said screw being adjustable therethrough and extending downwardly therefrom immediately over a reduced passage 33 communicating with the chamber of the valve housing and the fluid intake 23.

The valve stem screw 32 is provided on the lower end thereof with a socket or recess 34 into which the rounded head 35 of a disk valve 36 is adapted to seat when said valve is placed in position. The head 35 of the valve is joined thereto by a flattened neck portion 37 adapted to be slidably engaged between the spaced spring-like arms 38 of a spring metal bracket 39. Said bracket is mounted in position on the end of the lever 26 by loosely mounting the upper portion thereof over an upwardly extending pin 40 so as to permit it to have vertical movement with respect thereto without becoming disengaged therefrom. The lower rearward end of the bracket extends under the forward portion of the head of the lever 26 and is rigidly secured to a shoulder thereof. This permits of a spring movement of said bracket in a vertical plane. The bracket is provided in its front face with an enlarged opening 40 adapted to receive the head 35 of the valve, said valve being held in position within the bracket by the engagement against the flattened portions of its neck 37 by the spaced arms 38. Upon the screw 32 being adjusted to engaging position, the head 35 will be embraced by the socket or recess 34 formed in the lower end thereof so as to normally maintain the valve in position and prevent it from moving out of engagement with the bracket.

Access to the valve may be had by removing the plate 25, whereupon the removal or replacement of the valve may be had by grasping the same by a pair of pliers or the like and forcibly moving it longitudinally, so that its head 35 may be engaged with or disengaged from the recess or socket 34 of the screw 32 upon the spring tension of the bracket 39 being overcome. In other words, the spring tension of the bracket 39 has the effect of normally maintaining the head 35 of the valve in engagement with the socket 34 under spring tension, but permitting its forcible removal therefrom.

The invention claimed is:

1. In a fluid pressure regulator, the combination with a housing embodying a diaphragm, of a lever member mounted in said housing, a valve member removably secured on one end thereof, a socket formed on one of said members and a cooperating head on the other member, and resilient means rigidly secured to said end of the lever for normally maintaining said head and socket in engagement.

2. In a fluid pressure regulator, a lever member, a valve member, one of said members being provided with a socket and the other member with a head adapted to seat therein, and a spring rigidly secured to said lever member and adapted to engage the other member for normally maintaining said head and socket in engaging position under spring pressure while permitting the forcible release of one from the other.

3. In a fluid pressure regulator, a lever member, a valve member, one of said members being provided with a socket and the other member with a head adapted to seat therein, and a spring metal bracket secured to said lever member provided with a receiving slot therein for the reception of the other member and normally maintaining said head in engagement with the socket under spring pressure while permitting the forcible release or engagement thereof.

4. In a fluid pressure regulator, a housing, a lever member therein movable by fluid under pressure, a valve seat associated with said housing, a valve member associated with said lever member for substantially universal movement relative thereto and cooperable with said valve seat, and resilient means supported in said housing independently of said valve member but having a loose cooperation with said valve member to connect it to said lever member whereby said valve member may adjust itself to properly engage said valve seat.

5. In a fluid pressure regulator, a lever member, a valve member, one of said members being provided with a projecting portion having a socket formed in the end thereof and the other member with a projecting portion having a head formed on the end thereof adapted to seat in said socket, and a spring bracket mounted on said lever member having a slot therein for receiving one of said projections and maintaining said projections in seated relation with respect to each other, the head of one engaging in the socket of the other.

6. In a fluid pressure regulator, a lever member, a valve member, one of said members being provided with a projecting portion having a socket formed in the end thereof and the other member with a projecting portion having a head formed on the end thereof adapted to seat in said socket, and a spring metal bracket having one end loosely mounted on the lever member and the other end fixedly connected therewith so as to permit of a spring action, said bracket being bifurcated to receive the projection upon the valve member and maintain it in engagement with the projection on the lever member under spring tension, whereby the head and socket of the respective projections will normally be held in position subject to forcible release one from the other.

7. In a fluid pressure regulator, a lever, a removable valve adapted to be mounted thereon, said lever having a socket formed therein and said valve being provided with a head adapted to seat in said socket, and a bifurcated spring bracket mounted on the end of said lever adapted to slidably receive the head portion of said valve and normally maintain it under spring tension in engagement with the recess provided therefor in said lever.

8. In a fluid pressure regulator, a lever provided with a recess, a valve, a head on said valve adapted to seat in said recess, a neck portion connecting said head and valve and having the opposite sides thereof flattened, and a bifurcated spring metal bracket mounted upon the end of said lever adapted to receive the flattened surface of the neck portion for preventing rotation of said valve and maintaining the head thereof in engagement with the recess in said lever.

9. In a fluid pressure regulator, a lever, a valve, a head mounted on said valve, a neck having flattened sides connecting said head and valve, an adjustable screw extending through said lever and having a recess on one end thereof in which said head is adapted to seat, and a spring bracket mounted on the end of said lever provided with a slot therein for receiving the flattened surface of the neck and thereby preventing rotation of said valve, said bracket being adapted to retain the head in seated relation with the recess of said screw under spring tension for normally preventing displacement thereof.

In testimony whereof, I have hereunto subscribed my name at Anderson, Madison County, Ind.

JACOB C. GROBLE.